United States Patent
Waldron

[11] Patent Number: 5,982,992
[45] Date of Patent: Nov. 9, 1999

[54] ERROR DIFFUSION IN COLOR PRINTING WHERE AN INTRA-GAMUT COLORANT IS AVAILABLE

[75] Inventor: Brian L. Waldron, Penfield, N.Y.

[73] Assignee: Xerox Corporation, Stamford, Conn.

[21] Appl. No.: 08/924,734

[22] Filed: Sep. 5, 1997

[51] Int. Cl.[6] .............................. B41B 15/00; B41J 15/00; G06F 15/00
[52] U.S. Cl. ........................... 395/109; 358/518; 358/525
[58] Field of Search ............................ 395/109; 358/505, 358/518, 525, 534, 535, 455, 456, 457; 382/162, 167; 345/153, 199

[56] References Cited

U.S. PATENT DOCUMENTS

| | | | |
|---|---|---|---|
| 5,070,413 | 12/1991 | Sullivan et al. | 358/456 |
| 5,087,981 | 2/1992 | Ng et al. | 358/459 |
| 5,432,893 | 7/1995 | Blasubramanian et al. | 395/131 |
| 5,561,751 | 10/1996 | Wong | 395/131 |
| 5,594,558 | 1/1997 | Usami et al. | 358/518 |
| 5,621,545 | 4/1997 | Motta et al. | 358/518 |
| 5,621,546 | 4/1997 | Klassen et al. | 358/536 |
| 5,740,076 | 4/1998 | Lindbloom | 382/167 |

*Primary Examiner*—Kimberly A. Williams
*Attorney, Agent, or Firm*—R. Hutter

[57] ABSTRACT

In a digital printing apparatus in which primary colorants are selected by an error-diffusion process, a method takes into account situations in which a colorant is selectable from within the gamut defined by certain other primary colorants. In the case of a printer in which, in addition to CMYK colorants, a mid-gray colorant is also selectable, the method avoids the problem in which an error-diffusion algorithm mandates the simulation of colors outside the gamut.

6 Claims, 2 Drawing Sheets

ERROR DIFFUSION IN COLOR PRINTING WHERE AN INTRA-GAMUT COLORANT IS AVAILABLE

FIELD OF THE INVENTION

The present invention relates to color printing, and in particular to color printing in which a small set of colorants, such as inks, are placed on a sheet in a manner to create a large range of apparent colors. The present invention is most useful in digital printing apparatus, such as xerographic or ink-jet printers.

BACKGROUND OF THE INVENTION

Digital printing apparatus, such as electrophotographic "laser" printers and ink-jet printers, are well known. In color digital printing apparatus, a small set of colorants, typically black, yellow, magenta, and cyan, are selectably placed in different areas on a print sheet, and small areas of each primary colorant are allowed to blend together optically, to create a large range, or gamut, of colors which would be apparent to an observer.

To obtain a large gamut of colors from a small number of colorants, a variety of halftoning techniques can be applied. One technique, known as "error diffusion," is well known. In error diffusion, in order to print a small area of a desired "source color," the source color is located in color space relative to the locations of the primary colorants, such as yellow, magenta, and cyan; the colorant which is closest to the target color in color space is then selected for one pixel area. However, the error, essentially meaning the Euclidean distance in color space between the source color and the selected colorant, is recorded, and is in effect distributed or diffused to the image data of neighboring pixel areas. In brief, this diffusion of each error to neighboring pixel areas will influence the decision of which primary colorant to use in those neighboring pixel areas. The overall effect is, over a reasonably large number of pixels, an optical blend resulting in the desired source color.

Recently, particularly in the technology of ink-jet printing, there has been developed a hardware option in which selectably available colorants are provided beyond the usual pure primary colorants, such as cyan, magenta, and yellow. In some designs, there may be available colorants of additive colors, such as red, blue, and green, in addition to the subtractive colors; in other designs, there may be available for selection a colorant which represents a lighter or "diluted" version of another primary color, such as a light cyan, which is 50% lighter than regular cyan. The use of such additional colorants can enhance and/or enlarge the available gamut associated with a particular apparatus. One particular additional colorant, which will be the subject of the embodiment of the present invention described below, is, in addition to a pure black K colorant, a mid-gray (MG) colorant, which in effect is a 50% dilution of black ink. Selectable use of the mid-gray ink will, of course, be helpful in the creation of monochrome halftones (such as black-and-white photographs) and also for the creation of non-saturated colors.

These additional colorants, such as light cyan or mid-gray, can be considered "intra-gamut" colorants; which is to say, whereas pure colorants such as cyan or magenta define a gamut and are therefore disposed in color space at the edge or surface of a gamut, these intra-gamut colorants are disposed in color space inside the gamut defined by other colorants. While this is useful for obtaining accurate representations of colors, such as "pastels," which are near the white or gray areas of a gamut, use of such intra-gamut colorants can interfere with the error-diffusion colorant selection process. If an error-diffusion selection process occasionally "decides" that an intra-gamut colorant, such as mid-gray, is desirable for a particular pixel in an image, the resulting error from selection of this intra-gamut color, when diffused to influence the selection of colorants for neighboring pixels, may require the selection of colors which are out of the gamut and which would be physically impossible to obtain with the available colorants. In many situations, selection of a colorant from inside the gamut can lead to errors which require selection of colorants outside the gamut, which are not available.

The present invention is directed to an error-diffusion system, specifically for use in apparatus wherein intra-gamut colorants, such as mid-gray, or lighter or diluted versions of primary color colorants, are available.

DESCRIPTION OF THE PRIOR ART

In the prior art, U.S. Pat. No. 5,070,413 describes a halftoning method using color vector error diffusion.

U.S. Pat. No. 5,087,981 discloses an error-diffusion method useful when printing halftones with overlapping dots.

U.S. Pat. No. 5,432,893 discloses a vector error-diffusion technique which is particularly useful for image data in the form of chrominance and luminance values, the results of which are then transformed into sets of RGB output color codes.

U.S. Pat. No. 5,561,751 discloses a system for displaying a color image using vector error diffusion. The method characterizes each color that can be displayed by measuring the color directly using a colorimeter which eliminates errors caused by non-linear combinations of the color vectors.

U.S. Pat. No. 5,594,558 discloses a system which checks whether a color desired to be printed falls within the "color reproduction region" of an output apparatus such as a printer. When the input color image falls outside the reproduction region, color reproduction is performed by color conversion processing.

U.S. Pat. No. 5,621,545 discloses an error-diffusion digital printing technique, in which the error-diffusion is performed in a LAB color space, different from the CMY color space typical of a printer. The perceptual linearity of the LAB color space provides for enhanced color fidelity in the printed image.

U.S. Pat. No. 5,621,546 discloses a system for performing vector error-diffusion which reduces the visibility of an error-diffusion pattern which would be apparent in the dot pattern forming the color printed.

SUMMARY OF THE INVENTION

According to the present invention, there is provided a method of selecting colorants from a selectable plurality of colorants over a set of pixels to obtain a desired source color defined in a color space representing a gamut of colors which an output apparatus is capable of rendering. For a first pixel, for each of the plurality of colorants, an error is calculated, the error being a negative of a distance in color space between the colorant and the source color. For the first pixel, for each of the plurality of colorants, the error is added to the source color to obtain a new color. If, for a colorant of the plurality of colorants, the new color is not disposed within the gamut, an apparent distance between said colorant and the source color is revised. For printing the first pixel, the colorant is selected having the closest apparent distance in color space to the source color.

DETAILED DESCRIPTION OF THE INVENTION

Figure 1:
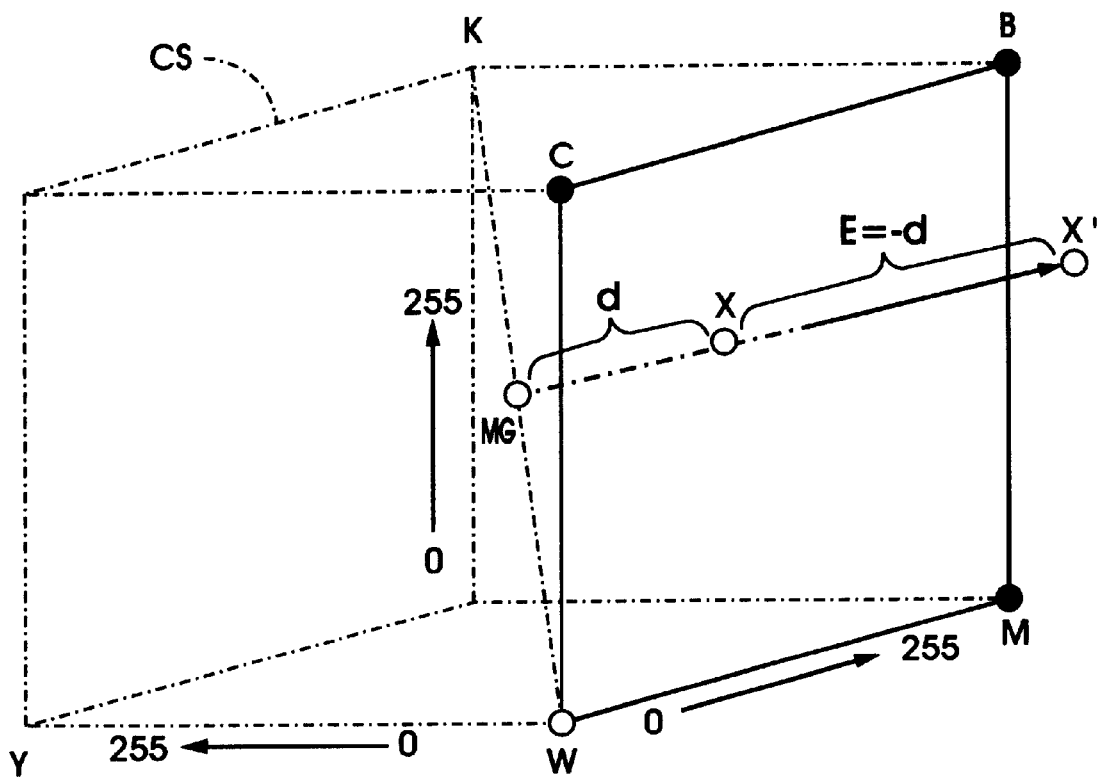
FIG. 1 is an illustration of an example color space, illustrating the principle of the present invention.

FIG. 1 is an illustration of a simplified "gamut," or color space, generally indicated as CS, which represents a three-dimensional volume in which every combination of the various primary colorants in a particular printing apparatus is available. Starting at the lower corner marked W in FIG. 1, a white (W) value indicates that no colorant is placed in a particular pixel area in an image to be printed. As can be seen, extending from the point W along three axis are values which range from 0 (closest to W) to 255 (full color saturation) in different directions. These three directions represent contributions of three primary colorants, yellow (Y), cyan (C), and magenta (M). The more a particular colorant is apparent, the farther along any particular axis (up to 255) would be the value of the particular color in color space.

It will be noted that the locations of the pure colorants themselves in color space represent the corners of the cube forming gamut CS. Any color formed by an optical combination of two or more CMY colorants will in effect be located inside this cube. Also, any desired color which can be formed by exactly two of the CMY colorants will be disposed on the surface of the cube. By selection of different combinations of levels of the primary CMY colorants, different locations within the cube-shaped color space can be "reached" by a printing or display apparatus. Further, if every primary CMY colorant is close to 255, the location of the resulting color will be close to the corner marked K in color space, which represents black. In many designs of electrophotographic and ink-jet printers, however, black colors are obtained by a separately-selectable black colorant.

Although it is well known to provide printing apparatus with selectable values for C, M, and Y, it is also known to provide an apparatus in which there is available one or more further colorants which are in effect located within the gamut or color space CS defined by the primary CMY colorants. Recently there has become available in the market digital printing apparatus, such as an ink-jet printer or electrophotographic "laser" printers, in which, in addition to the primary CMY or K colorants, one may select, for printing in a particular pixel area in an image to be printed, a colorant which is effectively located inside the gamut CS. One example of such an "intra-gamut" colorant is mid-gray, indicated as MG in FIG. 1, although other types of intra-gamut colorants, such as "light cyan" (which would be disposed, for example, halfway along the axis between W and C) could be imagined. In the particular illustrated embodiment, MG, is a colorant located in color space midway along the axis between W and K, going through the center of the cube. The mid-gray MG represents a diluted black ink, for example.

To illustrate the principle of the method of the present invention, consider a color desired to be printed in an image here indicated as a source color at the location marked X. This color X is disposed near the surface of the gamut CS formed by the points marked CWMB, but is also reasonably close to the location in color space of mid-gray MG. The particular problem addressed by the present invention occurs when selecting which colorants to use in order to obtain this desired source color X by a combination of, in this case, C, MG, and M colorants.

Under the basic well-known technique of error diffusion to select colorants, a source color such as X desired to be printed is located in color space, and the colorant selected for a particular pixel is the colorant which is closest, by Euclidean distance, to the source color X in color space. Once the particular colorant is selected, the distance, here indicated as d, is calculated in terms of both magnitude and direction, and then the error, which is the negative of the distance (same magnitude, opposite direction), is then "diffused" to influence the color selection decision for a certain subset of neighboring pixels, as is known in the art; i.e., a fixed proportion (such as "Floyd-Steinberg weights") of the error is applied to each of a plurality of the neighboring pixels, thereby altering the position of the source color for the neighboring pixels. The contribution of the diffused error from the colorant selection in one pixel influences the color selection for a neighboring pixel: the colorant selection for the neighboring pixel may be different than it originally would have been, because this error from a previous pixel selection has been added to it. The specific desired overall color (such as a shade of brown) is obtained as the cumulative result of this error diffusion over a reasonably large number of pixels. (Of course, the present discussion is directed to obtaining a desired source color over a fairly large set of pixel areas; in "busy" images, where the desired source color changes abruptly across the image, an error-diffusion technique will have a different effect on the selection of colorants.)

When an intra-gamut colorant such as MG is selected, however, the error, meaning the negative of the distance to the source color X, which is diffused to influence the selection of other pixels, occasionally causes a practical problem. When this error is added to the source color X for the selection of a colorant for a neighboring pixel, the resulting new source color, indicated as X' in FIG. 1, is "pushed" effectively out of the gamut CS. This pushing of the new source color out of the gamut comes about because the selected colorant MG is located toward the center of the gamut, and thus the resulting error vector is "pointed" directly out of the gamut CS. If this error-diffused new source color X' is the color that would serve as the new source color from which a colorant would be selected in the neighboring pixel, it would be impossible to select a combination of primary colors such as CMY which could possibly simulate this color, and the whole error-diffusion process is confounded. This, in brief, is the problem with error-diffusion color selection techniques when one of the available colorants is inside the gamut created by other colorants.

Figure 2:
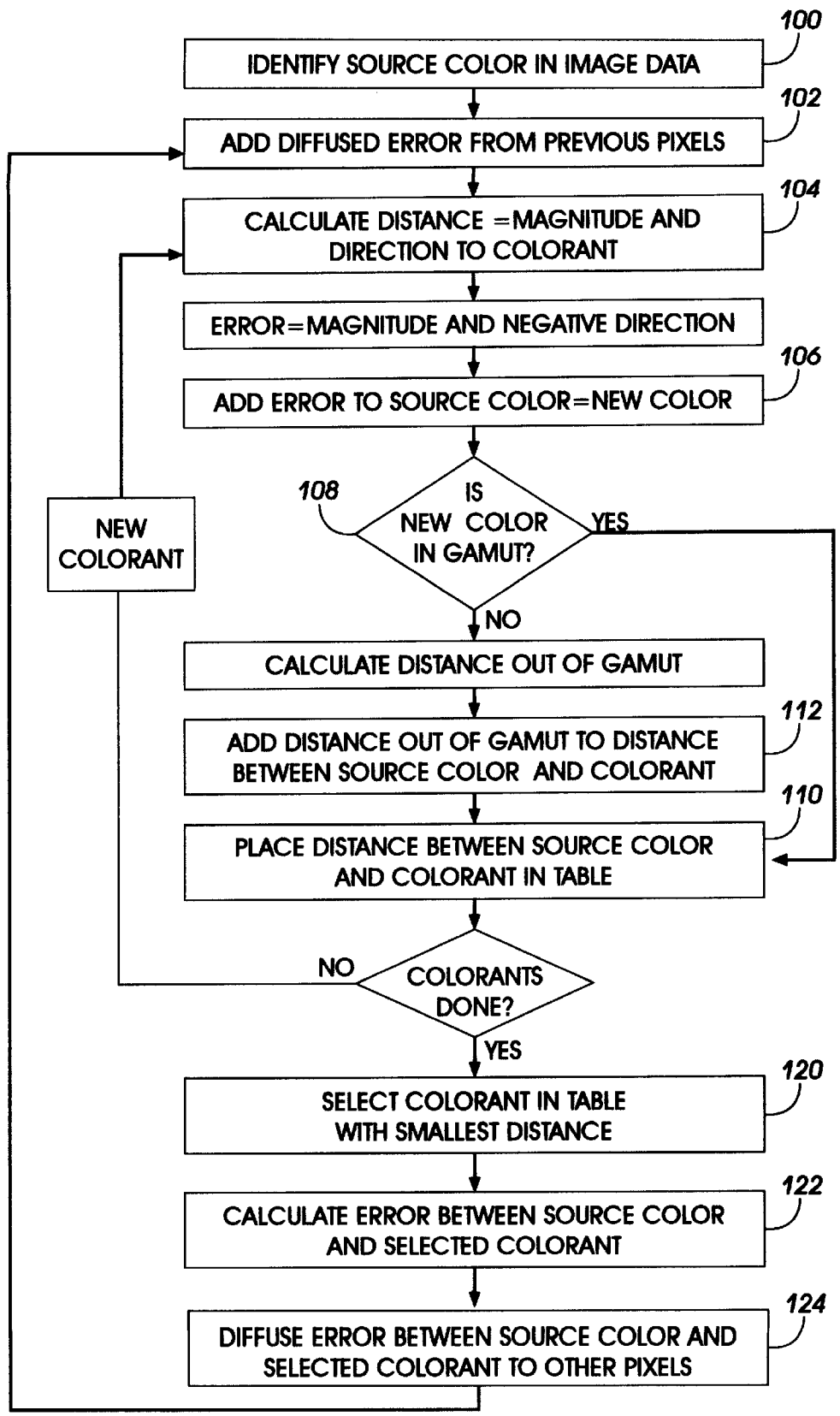
FIG. 2 is a flowchart illustrating the method of colorant selection according to the present invention.

The method of the present invention detects situations in which the selection of a particular intra-gamut colorant would cause this out-of-gamut problem, and if such a situation is detected, influences the selection of colorants to avoid this out-of-gamut problem. FIG. 2 is a flowchart illustrating the method of the present invention, as practiced on the selection of a colorant for one pixel in an image desired to be printed. It will be noted, of course, that even though a particular source color such as X in FIG. 1 is desired to be printed, the issue for an individual pixel is to choose which primary colorant to place in that pixel; to obtain the source color, of course, further requires selection of colorants in neighboring pixels so that the desired optical blend simulating the source color is obtained. However, in the present invention the method of selection is carried out on a pixel-by-pixel basis, and the overall effect of the present method over a large number of pixels is to obtain the desired source color by selecting a relatively large number of pixels of different colorants.

Turning now to FIG. 2, the source color is identified from the original image data and located in color space. In FIG. 1, this is a simple CMY color space, but it is conceivable to perform this operation in, for example, LAB or XYZ color space as well. Once the source color X is identified in color space, there is also added to the identified source color a diffused error which may have come from an error-diffusion process applied on a neighboring pixel previously, as is typical in error-diffusion algorithms, as shown at block 102. However, after the diffused error is added to the source color, the fundamental decision can be made of which colorant to choose for that particular pixel.

First there is calculated, at block 104, a distance, which is defined as the magnitude and vector direction of the source color, (optionally, plus a diffused error from a previous pixel) relative to one colorant, such as C, M, or Y, or even MG in the present example. This distance is calculated as a Euclidean distance, as is known in the art. Once the distance is calculated, an error is calculated, which is typically simply a vector having the same magnitude, but negative direction, relative to the distance. This error is then added to the source color in color space to yield at block 106, what is here called a "new color."

At decision block 108, it is determined whether this new color is within the gamut. This decision is typically simple: if, for example, the valid values in the color space always range from 0 to 255, a calculation of the new color which yields a negative number or a number over 255 for any dimension is clearly out-of-gamut. If the new color is in the gamut CS, the distance between this new color and a particular colorant is placed in a table as shown at block 110. If, however, it is determined that this new color is out of the gamut CS, a calculation is made of how far this new color, such as X' in FIG. 1, is out of the gamut, i.e., beyond the surface of the gamut along the direction of the vector. Once again, this is calculated as a Euclidean distance. This distance out-of-gamut, which is only the distance beyond the surface of color space CS, is then added to the distance from the source color to the colorant, which was calculated at block 104, as shown at block 112. (It is also conceivable to add only a fixed proportion of the distance out-of-gamut to the distance from the source color to the colorant.) This will have the effect of revising the position of the new color and increasing the apparent distance between the source color and colorant under consideration.

As in the case where the calculated "new color" was in the gamut, this revised apparent distance from the colorant to source color for out-of-gamut new colors is placed in a table temporarily, such as at block 110. As shown in FIG. 2, this process is carried out for each available colorant (such as C, M, Y, and MG) in the apparatus; once all of these distances are compiled, then the selection can be made of which colorant is apparently closest to the source color, as shown at block 120. Effectively changing, for colorants causing out-of-gamut new colors, the apparent distance in color space between the colorant and the source color will of course alter the selection of which colorant is closest to the source color, making the colorant causing an out-of-gamut new color less "attractive" to select.

Once a particular colorant is selected in this way, there will inevitably be some error between the selected colorant and the source color, and this error is calculated as shown at block 122. The error between the source color and the selected colorant is then entered into an error-diffusion process, such as at block 124, to influence the decision of which colorant to choose for neighboring pixels.

In overview, the present invention is a method of amending the resulting error that results when an intra-gamut colorant is selected. These results, intentionally "distorted" by the method of the present invention, affect which colorants are selected for neighboring both a particular pixel in question and, later, for neighboring pixels. The effect over a large number of pixels is ultimately to obtain the desired source color X, and also to avoid situations in which the error propagation method requires the selection of colorants to "reach" a color which is in fact physically impossible to obtain with the selectable colorants. By making sure all of the source colors, plus previously-mandated error-diffused colorant selections, are always within the gamut, the present invention enables printing apparatus in which intra-gamut colorants such as mid-gray are available, to obtain more realistic halftones and specific colors.

While the invention has been described with reference to the structure disclosed, it is not confined to the details set forth, but is intended to cover such modifications or changes as may come within the scope of the following claims.

I claim:

1. A method of selecting colorants from a selectable plurality of colorants over a set of pixels to obtain a desired source color defined in a color space representing a gamut of colors which an output apparatus is capable of rendering, at least one of said plurality of colorants being disposed within the gamut, comprising the steps of:

for a first pixel, for each of the plurality of colorants, calculating an error, the error being the negative of a distance in color space between a selected colorant and the source color;

for the first pixel, for each of the plurality of colorants, adding the error to the source color to obtain a new color;

if, as a result of selecting a colorant disposed within the gamut, the new color is not disposed within the gamut, revising an apparent distance between said colorant and the source color; and selecting, for printing the first pixel, the colorant having the closest apparent distance in color space to the source color.

2. The method of claim 1, further comprising the step of entering the error associated with the selected colorant into an error-diffusion algorithm affecting other pixels in the image.

3. The method of claim 1, wherein the location of the source color in color space is affected by an error-diffusion algorithm applied to other pixels in the image.

4. The method of claim 1, the revising step including the steps of calculating a distance out of the gamut the new color is located, determining an out-of-gamut error based on said distance out of the gamut, and altering the apparent distance between the colorant and the source color in the color space by a proportion of the out-of-gamut error.

5. The method of claim 1, wherein a first subset of the plurality of colorants is disposed on a surface of the gamut in the color space, and a second subset of the plurality of colorants is disposed within the gamut in the color space.

6. A method of selecting colorants from a selectable plurality of colorants over a set of pixels to obtain a desired source color defined in a color space representing a gamut of colors which an output apparatus is capable of rendering, at least one of said plurality of colorants being disposed within the gamut, comprising the steps of:

for a first pixel, applying a first error-diffusion algorithm to select a colorant to be placed in a pixel space to approximate the source color;

for a second pixel, if the colorant selected for the first pixel was disposed within the gamut and if the colorant selected for the first pixel has an effect on selecting the colorant for the second pixel, applying a second error-diffusion algorithm different from the first error-diffusion algorithm to select a colorant to be placed in a pixel space to approximate the source color.

* * * * *